(12) United States Patent
Yamaguchi

(10) Patent No.: US 12,157,173 B2
(45) Date of Patent: Dec. 3, 2024

(54) CUTTING INSERT, CUTTING TOOL, AND METHOD FOR MANUFACTURING MACHINED PRODUCT

(71) Applicant: KYOCERA CORPORATION, Kyoto (JP)

(72) Inventor: Eri Yamaguchi, Yasu (JP)

(73) Assignee: KYOCERA CORPORATION, Kyoto (JP)

( * ) Notice: Subject to any disclaimer, the term of this patent is extended or adjusted under 35 U.S.C. 154(b) by 410 days.

(21) Appl. No.: 17/625,093

(22) PCT Filed: Jun. 11, 2020

(86) PCT No.: PCT/JP2020/023028
§ 371 (c)(1),
(2) Date: Jan. 6, 2022

(87) PCT Pub. No.: WO2021/005951
PCT Pub. Date: Jan. 14, 2021

(65) Prior Publication Data
US 2022/0288698 A1    Sep. 15, 2022

(30) Foreign Application Priority Data
Jul. 8, 2019 (JP) .................. 2019-127019

(51) Int. Cl.
*B23B 27/22* (2006.01)
*B23B 1/00* (2006.01)
*B23B 27/16* (2006.01)

(52) U.S. Cl.
CPC ............ *B23B 27/1611* (2013.01); *B23B 1/00* (2013.01)

(58) Field of Classification Search
CPC ........ B23B 2200/081; B23B 2200/321; B23B 2210/06; B23B 27/143; B23B 27/145; B23B 27/1607; B23B 27/1611
See application file for complete search history.

(56) References Cited

U.S. PATENT DOCUMENTS

| 5,897,272 | A | 4/1999 | Wiman et al. |
| 2010/0275749 | A1 | 11/2010 | Kobayashi |
| 2011/0033252 | A1 | 2/2011 | Nishida |

(Continued)

FOREIGN PATENT DOCUMENTS

| CN | 1151710 A | 6/1997 |
| CN | 102223975 A | 10/2011 |

(Continued)

*Primary Examiner* — Alan Snyder
(74) *Attorney, Agent, or Firm* — HAUPTMAN HAM, LLP

(57) ABSTRACT

A cutting insert in a non-limiting aspect of the present disclosure may include an upper surface, a lower surface, a lateral surface and a cutting edge. The upper surface may include a first corner and a first side. The upper surface may further include a first protrusion and a second protrusion. The first protrusion may be extended toward the first corner. The second protrusion may be located between the first corner and the first protrusion. The first protrusion may include an inclined surface. The inclined surface may be located along the first side. The inclined surface may include a first surface and a second surface. The second surface may be located further away from the first corner than the first surface. The first surface and the second surface may be individually inclined upward as going away from the first side, and having a concave shape as a whole.

19 Claims, 10 Drawing Sheets

(56) References Cited

U.S. PATENT DOCUMENTS

| | | | |
|---|---|---|---|
| 2011/0229279 | A1 | 9/2011 | Kobayashi |
| 2014/0286717 | A1 | 9/2014 | Lof et al. |
| 2015/0075338 | A1 | 3/2015 | Onodera |
| 2017/0297116 | A1 | 10/2017 | Sakai |

FOREIGN PATENT DOCUMENTS

| | | | |
|---|---|---|---|
| JP | H811008 | A | 1/1996 |
| JP | H10118807 | A | 5/1998 |
| JP | 2009255230 | A | 11/2009 |
| JP | 2014180755 | A1 | 9/2014 |
| WO | 2009028687 | A1 | 3/2009 |
| WO | 2013129083 | A1 | 9/2013 |
| WO | 2016043029 | A1 | 3/2016 |

CUTTING INSERT, CUTTING TOOL, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2020/023028 filed on Jun. 11, 2020, which claims priority to Japanese Patent Application No. 2019-127019, filed on Jul. 8, 2019, which is entirely incorporated herein by reference.

TECHNICAL FIELD

The present disclosure may generally relate to cutting inserts for use in a cutting process. Specifically, the present disclosure may relate to cutting inserts for use in a turning process.

BACKGROUND

For example, an indexable cutting insert (cutting insert) is discussed in Japanese Unexamined Patent Application Publication No. 2009-255230 (Patent Document 1) as a cutting insert for use in a cutting process of a workpiece, such as metal. The cutting insert discussed in Patent Document 1 may include a rake surface and a corner part disposed on a corner of the rake surface. The cutting insert discussed in Patent Document 1 may include a breaker protrusion, which is raised up gradually in a bisector direction of the corner part as going away from the corner part, on the rake surface in the vicinity of the corner part. The breaker protrusion may include a front top part having an approximately convex circular arc shape in a cross section along the bisector, and a concave part having an approximately concave circular arc shape in a cross section orthogonal to the bisector.

SUMMARY

A cutting insert in a non-limiting aspect of the present disclosure may include an upper surface, a lower surface, a lateral surface and a cutting edge. The upper surface may include a first corner and a first side. The first side may be extended from the first corner. The lower surface may be located on a side opposite to the upper surface. The lateral surface may be located between the upper surface and the lower surface. The cutting edge may be located on an intersection of the upper surface and the lateral surface.

The upper surface further may include a first protrusion and a second protrusion. The first protrusion may be extended toward the first corner. The second protrusion may be located between the first corner and the first protrusion. The first protrusion may include an inclined surface. The inclined surface may be located along the first side. The inclined surface may include a first surface and a second surface. The second surface may be located further away from the first corner than the first surface. The first surface and the second surface may be individually inclined upward as going away from the first side, and have a concave shape as a whole.

EMBODIMENTS

<Cutting Inserts>

Figure 1:
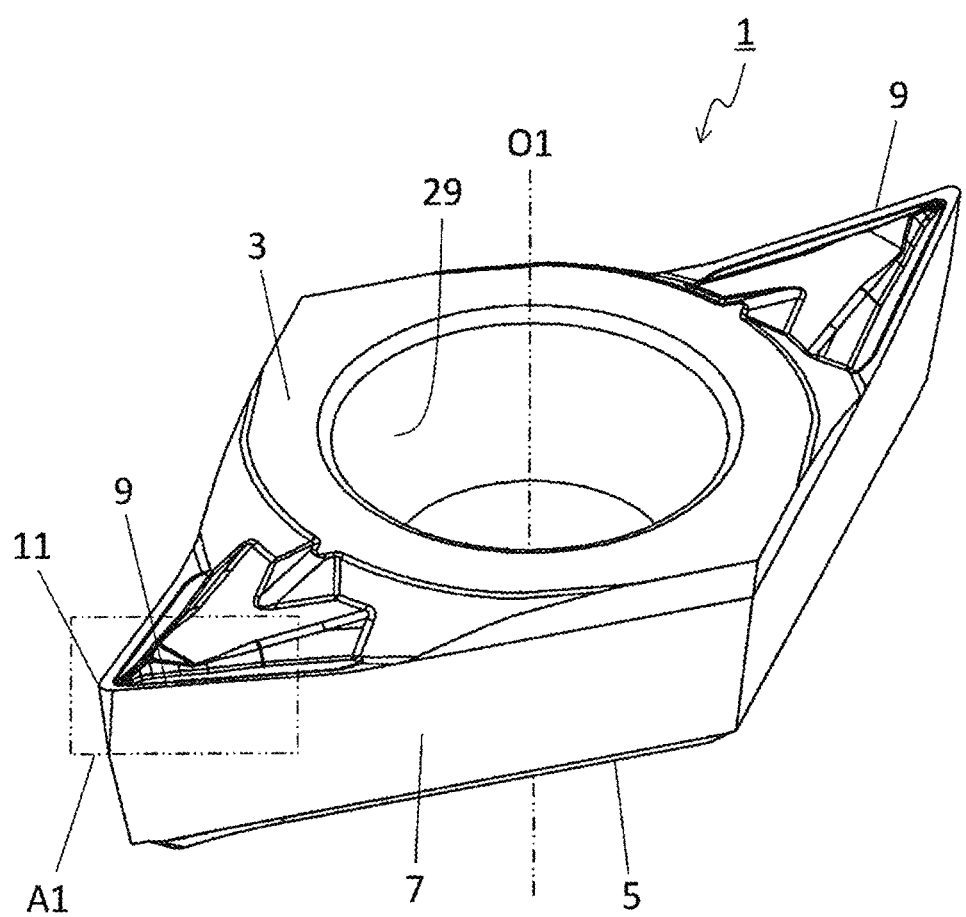
FIG. 1 is a perspective view illustrating a cutting insert in a non-limiting embodiment of the present disclosure.

The cutting insert 1 (hereinafter also referred to simply as "insert 1") in a non-limiting embodiment of the present disclosure may be described in detail below with reference to the drawings. For the sake of description, the drawings referred to in the following may illustrate, in simplified form, only main members necessary for describing the embodiment. The cutting insert 1 may therefore include any arbitrary structural member not illustrated in the drawings referred to. Dimensions of the members in each of the drawings may faithfully represent neither dimensions of actual structural members nor dimensional ratios of these members.

The insert 1 may include an upper surface 3, a lower surface 5, a lateral surface 7 and a cutting edge 9 as in a non-limiting embodiment illustrated in FIGS. 1 to 4. As used herein, the terms "the upper surface 3" and "the lower surface 5" may be used for the sake of convenience, and may not indicate upper and lower directions. For example, the upper surface 3 need not be directed upward when using the insert 1. These points may also be true for other parts including terms of upper and lower.

The upper surface 3 may have a polygonal shape in a top view (plan view). The top view may be a state where the insert 1 is viewed toward a side of the upper surface 3. The polygonal shape may be an approximately polygonal shape and need not be a strict polygonal shape. That is, sides in the polygonal shape may visually have an approximately straight line shape and need not be a strict straight line shape as a whole. The sides may include a straight line-shaped part on at least a portion connecting to the corner. For example, the sides may have a slightly curved convex shape or concave shape. Corner of the polygonal shape may have a convex curvilinear shape, such as a circular arc shape. If the corners have the circular arc shape, a radius of curvature of the corners may be kept constant or changed.

Figure 2:
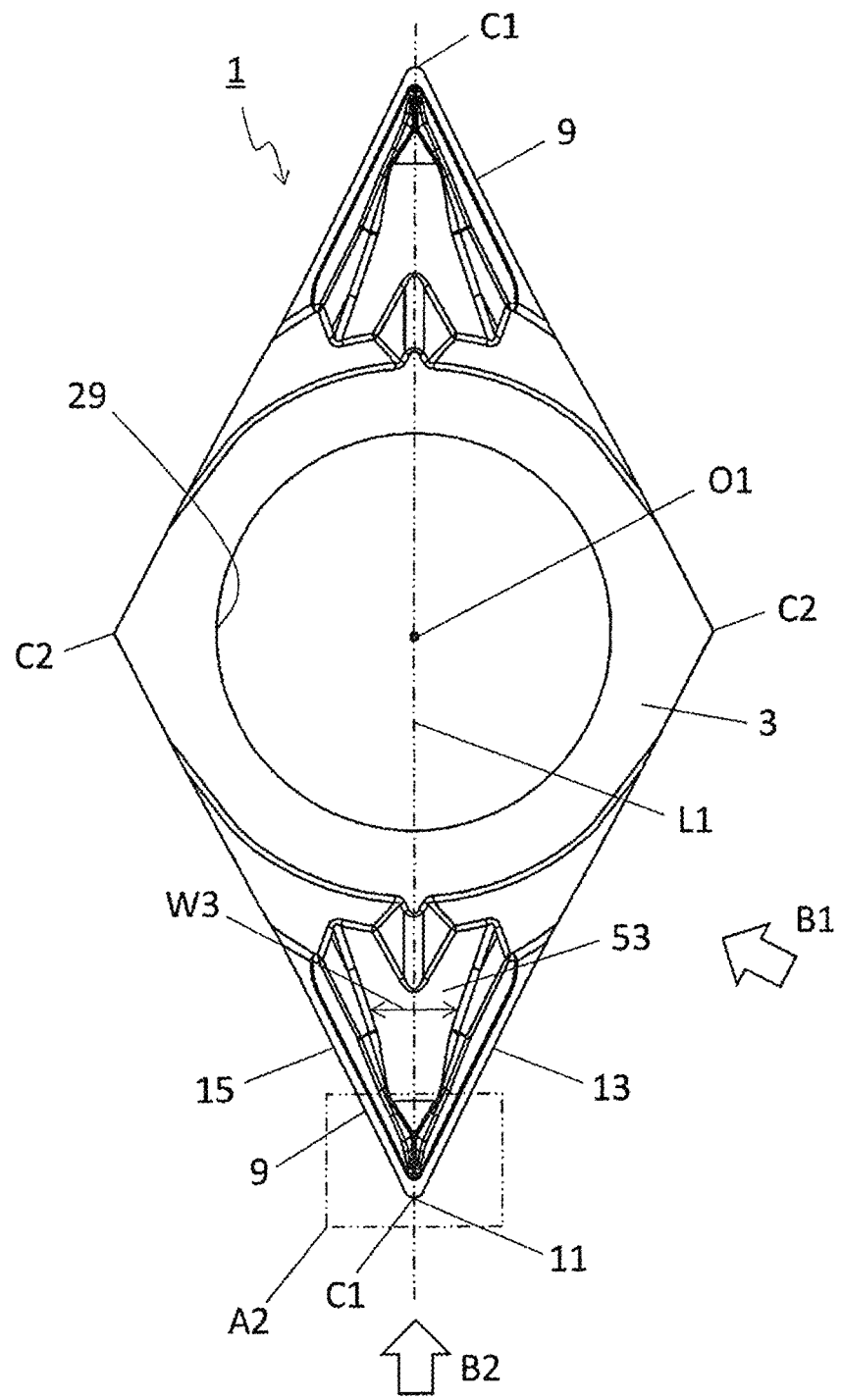
FIG. 2 is a plan view of the cutting insert illustrated in FIG. 1 as viewed from a side of an upper surface.

The upper surface 3 may have a quadrangular shape, more specifically a rhombus shape in a top view as in the non-limiting embodiment illustrated in FIG. 2. One of the four corners of the rhombus shape may be a first corner 11. Two sides of the four sides of the rhombus shape which are extended from the first corner 11, in other words, one of the two sides connecting to the first corner 11 may be a first side 13, and the other may be a second side 15.

The four corners of the rhombus shape may be constituted by two acute angle corners C1 and two obtuse angle corners C2. Each of the acute angle corners C1 may be a corner where an angle at which two sides extended from the corner intersect is smaller than right angles in a top view. Each of the obtuse angle corners C2 may be a corner where an angle at which two sides extended from the corner intersect is larger than right angles in a top view. The first corner 11 may be the acute angle corner C1.

The shape of the upper surface 3 is not limited to the shapes illustrated above. For example, the upper surface 3 may have a polygonal shape, such as a triangular or pentagonal shape. The quadrangular shape is not limited to the rhombus shape and may be, for example, parallelogram. These points may also be true for the lower surface 5.

The upper surface 3 may be in line symmetry with respect to a bisector L1 of the first corner 11. With this configuration, the same cutting performance may be attainable in both the case where the first corner 11 and the first side 13 are used for cutting out, and the case where the first corner 11 and the second side 15 are used for cutting out. The bisector L1 obtained if the first corner 11 has the convex curvilinear shape may be replaced with a bisector whose corner is an intersection of imaginary extension lines of the first side 13 and the second side 15 in a top view.

The upper surface 3 may have 180-degree rotationally symmetric shape with respect to a central axis O1 of the insert 1. The central axis O1 of the insert 1 may be an axis passing through a center of the upper surface 3 and a center of the lower surface 5.

Heights of the first corner 11 and the first side 13 may be constant or changed. For example, the height of the first corner 11 may become the largest at a center that intersects with the bisector L1 and may become smaller as going from the center toward the first side 13. Alternatively, the height of the first side 13 may become smaller as going away from the first corner 11.

Figure 3:
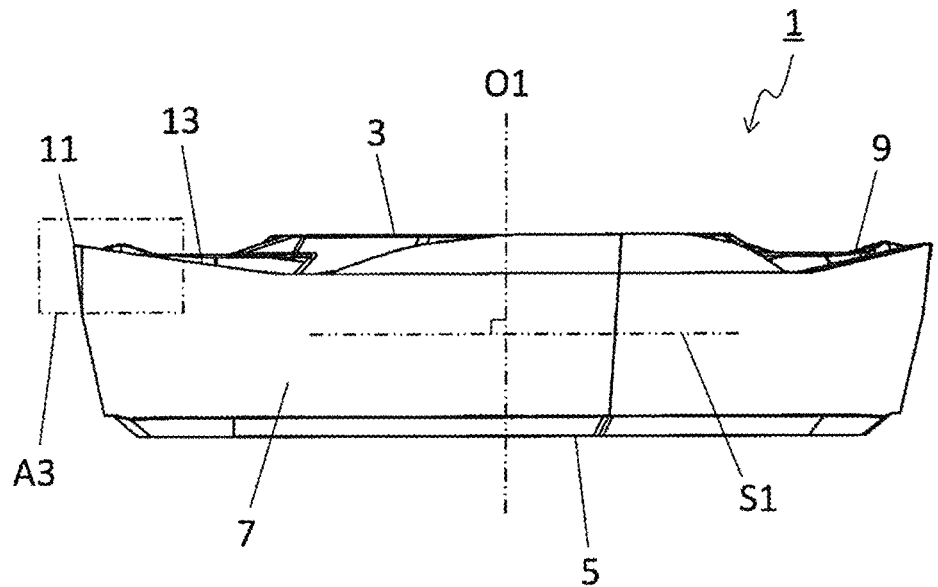
FIG. 3 is a plan view of the cutting insert illustrated in FIG. 2 as viewed from a B1 direction.
Figure 4:
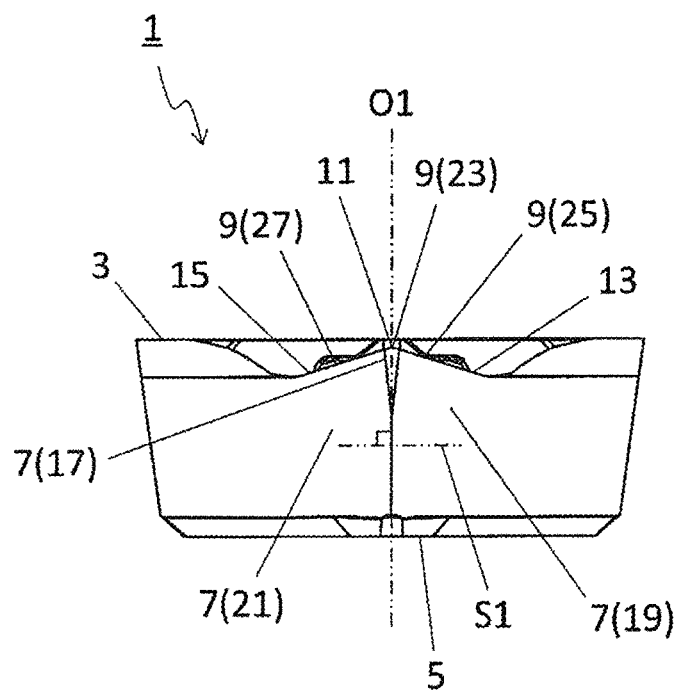
FIG. 4 is a plan view of the cutting insert illustrated in FIG. 2 as viewed from a B2 direction.

Evaluation of height may be made on the basis of the lower surface 5 if the lower surface 5 is flat as in the non-limiting embodiment illustrated in FIGS. 3 and 4. Alternatively, the evaluation of height may be made on the basis of an imaginary plane S1 which is orthogonal to the central axis O1 and is located between the upper surface 3 and the lower surface 5.

The lower surface 5 may be located on a side opposite to the upper surface 3. The lower surface 5 may be servable as a seating surface leading to a pocket when attaching the insert 1 to a holder.

Similarly to the upper surface 3, the lower surface 5 may have a polygonal shape. The lower surface 5 may have the same size as or may be smaller than the upper surface 3. The lower surface 5 may have a similar shape to the upper surface 3, and may be slightly smaller than the upper surface 3. The lower surface 5 may have a rhombus shape slightly smaller than the upper surface 3 as in the non-limiting embodiment illustrated in FIG. 1.

The lateral surface 7 may be located between the upper surface 3 and the lower surface 5. At least a part of the lateral surface 7 may be servable as a flank surface. The lateral surface 7 may connect to the upper surface 3 and the lower surface 5.

A surface region of the lateral surface 7 which is located along the first corner 11 may be a first corner lateral surface 17. A surface region of the lateral surface 7 which is located along the first side 13 may be a first lateral surface 19, and a surface region of the lateral surface 7 which is located along the second side 15 may be a second lateral surface 21. The first corner lateral surface 17 may have a convex curved surface shape. The first lateral surface 19 and the second lateral surface 21 may have a planar shape.

If the lower surface 5 has a shape slightly smaller than the upper surface 3 as in the non-limiting embodiment illustrated in FIG. 1, the lateral surface 7 may be inclined so as to come closer to the central axis O1 as going from a side of the upper surface 3 to a side of the lower surface 5. In other words, the insert 1 may have a so-called positive shape. The insert 1 may have a so-called negative shape. That is, the lateral surface 7 may be parallel to the central axis O1.

The cutting edge 9 may be located on an intersection of the upper surface 3 and the lateral surface 7. The cutting edge 9 may be usable for cutting out a workpiece. The cutting edge 9 may be located on a whole or a part of the intersection of the upper surface 3 and the lateral surface 7. A part of the cutting edge 9 which is located on the first corner 11 may be a first corner cutting edge 23. A part of the cutting edge 9 which is located on the first side 13 may be a first cutting edge 25, and a part of the cutting edge 9 which is located on the second side 15 may be a second cutting edge 27.

From the viewpoint of durability of a cutting edge, honing process, such as round honing, may be applied to the cutting edge 9. If the cutting edge 9 is subjected to the honing process, a part of the intersection of the upper surface 3 and the lateral surface 7 where the cutting edge 9 is located may have a slightly curved surface shape instead of a strict line shape formed by the intersection of the two surfaces.

The insert 1 may include a through hole 29. The through hole 29 may open into the upper surface 3 and the lower surface 5. The through hole 29 may be extended from the center of the upper surface 3 to the center of the lower surface 5. A central axis of the through hole 29 may coincide with the central axis O1 of the insert 1 as in the non-limiting embodiment illustrated in FIG. 1.

The through hole 29 may be usable for fixing the insert 1 to a holder. For example, a screw may be inserted into the through hole 29 when the insert 1 is screwed to the holder. A method for fixing the insert 1 to the holder is not limited to the fixing with the screw. For example, the through hole 29 may be used for fixing the insert 1 to the holder by a clamping member. In this case, the through hole 29 may not be extended to the lower surface 5.

The insert 1 is not limited to a specific size. For example, a maximum width of the upper surface 3 may be set to approximately 6-25 mm. A height from the upper surface 3 to the lower surface 5 may be set to approximately 1-10 mm. The height from the upper surface 3 to the lower surface 5 may be a length in a direction parallel to the central axis O1 in between an upper end of the upper surface 3 and a lower end of the lower surface 5.

The upper surface 3 may include a first protrusion 31 and a second protrusion 33 as in a non-limiting embodiment illustrated in FIGS. 5 to 9. The first protrusion 31 and the second protrusion 33 may also be called a breaker protrusion. The first protrusion 31 and the second protrusion 33 may be capable of controlling a flow direction of chips generated by the cutting edge 9. The first protrusion 31 may be extended toward the first corner 11. The second protrusion 33 may be located between the first corner 11 and the first protrusion 31.

The first protrusion 31 may include an inclined surface (sidewall surface) 35. The inclined surface 35 may also be called a rising wall surface or breaker wall surface. The inclined surface 35 may be located along the first side 13. The inclined surface 35 may include a first surface 37 and a second surface 39. The second surface 39 may be located further away from the first corner 11 than the first surface 37. The first surface 37 and the second surface 39 may have a planar shape. The first surface 37 and the second surface 39 may be individually inclined upward as going away from the first side 13, and may have a concave shape as a whole.

As used herein, the term "being inclined upward" may denote being included upward so as to depart from the lower surface 5 as going away from a region that becomes a reference. The phrase that the first surface 37 and the second surface 39 are individually inclined upward as going away from the first side 13 may denote that the first surface 37 and the second surface 39 are respectively inclined upward as going away from the first side 13.

This configuration may lead to high chip discharge performance. Specifically, because the first surface 37 and the second surface 39 individually have a planar shape inclined upward as going away from the first side 13, chips may be less likely to excessively come into contact with the first protrusion 31. Consequently, chip clogging may be less likely to occur, and the first protrusion 31 may be less prone to wear. Additionally, because the first surface 37 and the second surface 39 have the concave shape as a whole, it may be easy to avoid the chips from extremely extending in a direction opposite to a feed direction of a cutting tool with respect to the first protrusion 31. It may be easy to control the chip flow direction because the chips may flow along the first surface 37 and the second surface 39. This may lead to high chip discharge performance.

It may be possible to cope with various cutting conditions by including the first protrusion 31 and the second protrusion 33. Specifically, the chips can be handled by the first protrusion 31 under cutting conditions including a large depth of cut and a high feed rate. It may also be possible to stably handle the chips by the second protrusion 33 under cutting conditions including a small depth of cut and a low feed rate. The insert 1 may therefore be capable of coping with the various cutting conditions and therefore has high versatility.

In cases where the upper surface 3 includes only one protrusion with the inclined surface 35 having the concave shape, in other words, in the absence of the second protrusion 33, if the protrusion is extended to a portion corresponding to the second protrusion 33, the protrusion may become too thin, or alternatively space, such as a rake surface, may become too narrow. Consequently, the protrusion may become prone to damage, and the chip clogging may tend to occur.

An upper side and a lower side opposite to the upper side may be individually a direction along the central axis O1. That is, if a direction from the interior of the insert 1 toward the upper surface 3 is positive, and a direction from the interior of the insert 1 toward the lower surface 5 is negative, a positive side in the direction along the central axis O1 may be the upper side, and a negative side in the direction along the central axis O1 may be the lower side.

The first surface 37 and the second surface 39 need not be a strict flat surface shape and may have a substantially flat surface shape as long as the above effects are obtainable.

Figure 6:
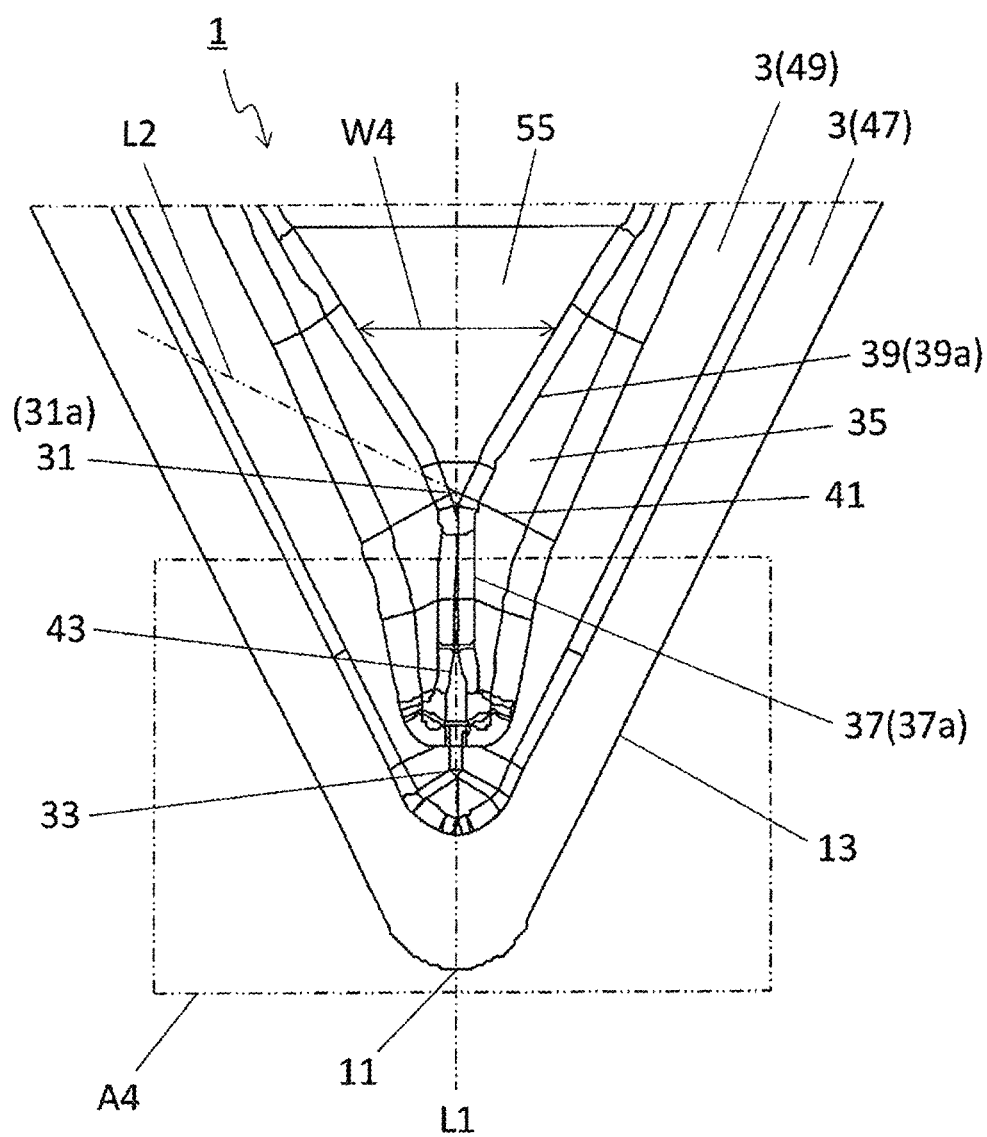
FIG. 6 is an enlarged view of a region A2 illustrated in FIG. 2.

An upper end 37a of the first surface 37 may be located further away from the first side 13 as going away from the first corner 11 in a top view as in a non-limiting embodiment illustrated in FIG. 6. In this case, chips generated on the first side 13 may tend to come into contact with the first surface 37 and then may move forward in a direction away from the first corner 11 while being temporarily curled so as to come closer to the first side 13. Hence, chip clogging may be less likely to occur, and a cutting resistance may tend to be reduced even for a large depth of cut. The upper end 37a may be inclined upward as going away from the first corner 11.

An upper end 39a of the second surface 39 may be approximately parallel to the first side 13 in a top view. If a part of the first side 13 which is located along the first surface 37 and the second surface 39 is used as a cutting edge, chips may tend to have a large width. Even in this case, the chip flow may tend to become stable if the upper end 39a of the second surface 39 is approximately parallel to the first side 13. Additionally, handling of chips may tend to become stable even for the large depth of cut. As used herein, the term "being approximately parallel to" does not denote being strictly parallel to, and may denote including a deviation of approximately ±10 degrees. The upper end 39a may be inclined downward as going away from the first corner 11. The term "being inclined downward" may denote being inclined toward the lower side.

An area of the first surface 37 may be identical to or different from an area of the second surface 39. If the area of the second surface 39 is larger than the area of the first surface 37 as in the non-limiting embodiment illustrated in FIG. 5, the chip flow direction may tend to become stable.

Figure 5:
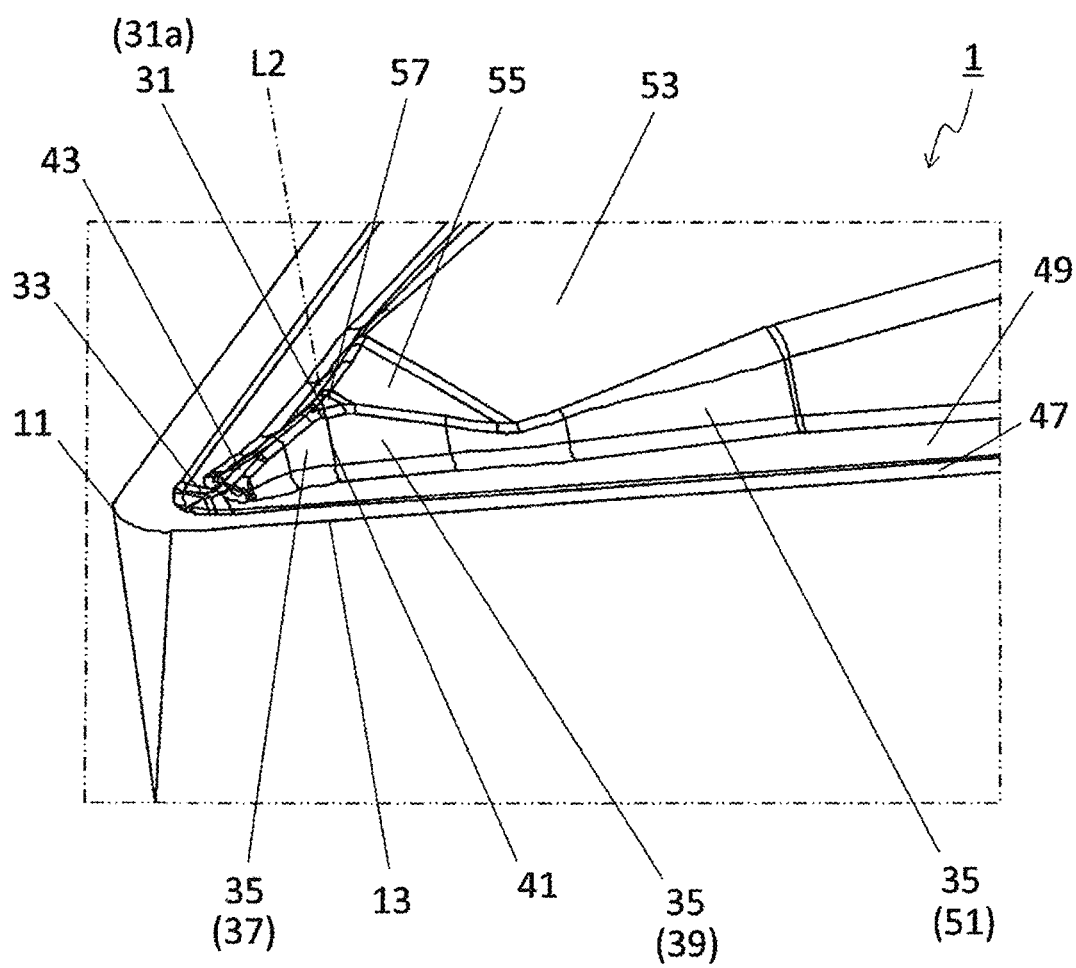
FIG. 5 is an enlarged view of a region A1 illustrated in FIG. 1.

A top part 31a of the first protrusion 31 may be located on an extension line L2 of a boundary 41 of the first surface 37 and the second surface 39 as in the non-limiting embodiment illustrated in FIGS. 5 and 6. In this case, chips may be less likely to climb over the breaker even for the large depth of cut. It may therefore be possible to stably handle chips in a wide range of feed rates. The top part 31a may be a part of the first protrusion 31 which has a maximum height. The second surface 39 may connect to the first surface 37. The boundary 41 may be located further away from the first corner 11 as going away from the first side 13 in a top view.

Figure 9:
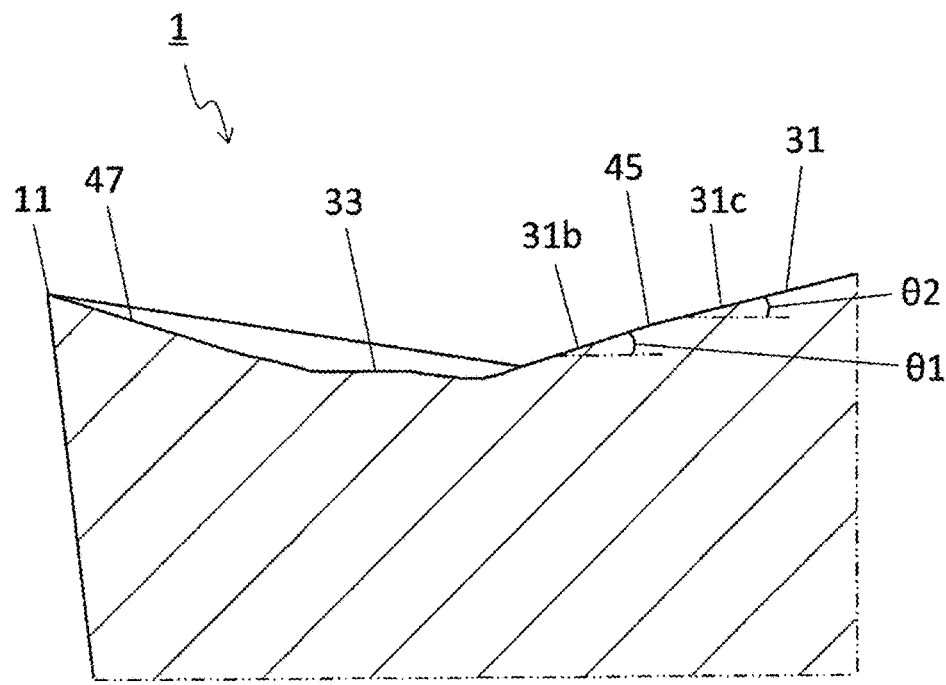
FIG. 9 is an enlarged view taken along the line IX-IX in the cutting insert illustrated in FIG. 8.

The second protrusion 33 may not be raised up in a cross section along the bisector L1 as in a non-limiting embodiment illustrated in FIG. 9. In other words, the second protrusion 33 may not be inclined upward as going away from the first corner 11. In this case, the cutting resistance may tend to be reduced even for a small depth of cut and a high feed rate. FIG. 9 may be a cross section that is located along the bisector L1 and is orthogonal to the lower surface 5.

If the lower surface 5 is flat, the second protrusion 33 may be parallel to the lower surface 5. This configuration may use the imaginary plane S1 as a reference. That is, the second protrusion 33 may be parallel to the imaginary plane S1. The second protrusion 33 may be inclined downward as going away from the first corner 11.

The first protrusion 31 may further include a third surface 43 faced to the first corner 11. This may facilitate more stable handling of chips at a small depth of cut. The third surface 43 may have a planar shape. The third surface 43 may be inclined upward as going away from the first corner 11. The third surface 43 may be located along the first surface 37. The third surface 43 may connect to the first surface 37.

The third surface 43 may have a triangular shape. The triangular shape may be defined similarly to the polygonal shape. If the third surface 43 has the triangular shape, chips may tend to be received by the third surface 43 at a low feed rate. Consequently, the handling of chips may tend to become stable. The handling of chips may also tend to become stable at a high feed rate.

Figure 8:
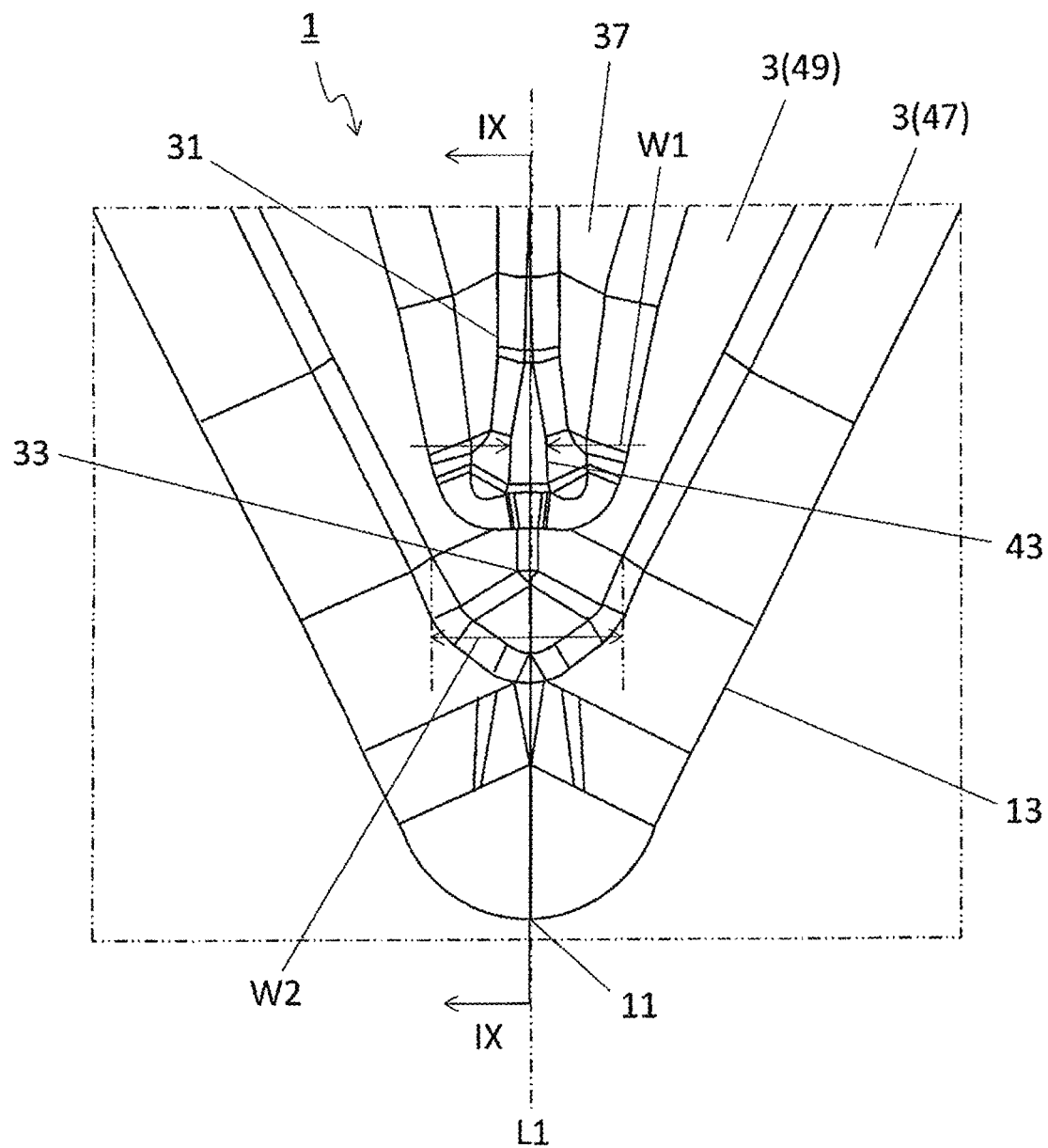
FIG. 8 is an enlarged view of a region A4 illustrated in FIG. 6.

A width of the third surface 43 in the direction orthogonal to the bisector L1 may be a first width W1 as in a non-limiting embodiment illustrated in FIG. 8. The first width W1 may decrease as going away from the first corner 11. The phrase that the first width W1 decreases may be a concept including the fact that there may be a part where the first width W1 remains unchanged as going away from the first corner 11, without being limited to a configuration that the first width W1 decreases over the entire length of the third surface 43. In other words, the third surface 43 may include a part where the first width W1 is constant, or may include a part where the first width W1 does not decrease at a certain rate. Alternatively, the first width W1 may decrease stepwise. These points may also be true for definition of widths in other parts.

A width of the second protrusion 33 in a direction orthogonal to the bisector L1 may be a second width W2. A maximum value of the first width W1 may be smaller than a maximum value of the second width W2. This may make it possible to stably handle chips in a wide range of depth of cut. For example, if the depth of cut is small as in cases where only the first corner cutting edge 23 is used as the cutting edge 9, chips may tend to have a small width, and behavior of the chips may tend to become unstable. However, the second width W2 may be relatively large, and therefore the chips having the small width may tend to stably come into contact with the second protrusion 33.

Additionally, the first width W1 may be relatively small, and therefore it may be easy to ensure large spacing between the first side 13 and the third surface 43. Hence, for example, if the depth of cut is large as in cases where the first corner cutting edge 23 and the first cutting edge 25 are used as the cutting edge 9, chips may be less likely to be caught between the first side 13 and the third surface 43.

The first protrusion 31 may include a first portion 31b and a second portion 31c in a cross section along the bisector L1 as in the non-limiting embodiment illustrated in FIG. 9. The first portion 31b may be located closer to the first corner 11 than the second portion 31c. The first portion 31b and the second portion 31c may be individually inclined upward as going away from the first corner 11. The second portion 31c may be adjacent to the first portion 31b.

An inclination angle θ1 of the first portion 31b may be larger than an inclination angle θ2 of the second portion 31c. That is, the first protrusion 31 may be a two-step inclination and may have a convex shape in the cross section along the bisector L1. This may make it easier to avoid the first protrusion 31 from excessively serving as a brake against a chip flow. The chip clogging may therefore be less likely to occur at the first protrusion 31 under machining conditions where chips climb over the first protrusion 31.

The boundary 45 of two-step inclination may be higher than the second protrusion 33. A boundary between the first portion 31b and the second portion 31c may correspond to the boundary 45 as in the non-limiting embodiment illustrated in FIG. 9. Thus, if the boundary 45 is higher than the second protrusion 33, stable handling of chips may be performable in a wide range of feed rates. The chips may tend to stably climb over the first protrusion 31 under machining conditions including higher feed rates. The chips may tend to stably come into contact with the first protrusion 31 under machining conditions where chips come into contact with the second protrusion 33 at a low feed rate.

The second protrusion 33 may have a convex curved surface shape. This may facilitate reduction in chip flow at the second protrusion 33. This may be because chips tend to come into strong contact with both the first protrusion 31 and the second protrusion 33.

Figure 7:
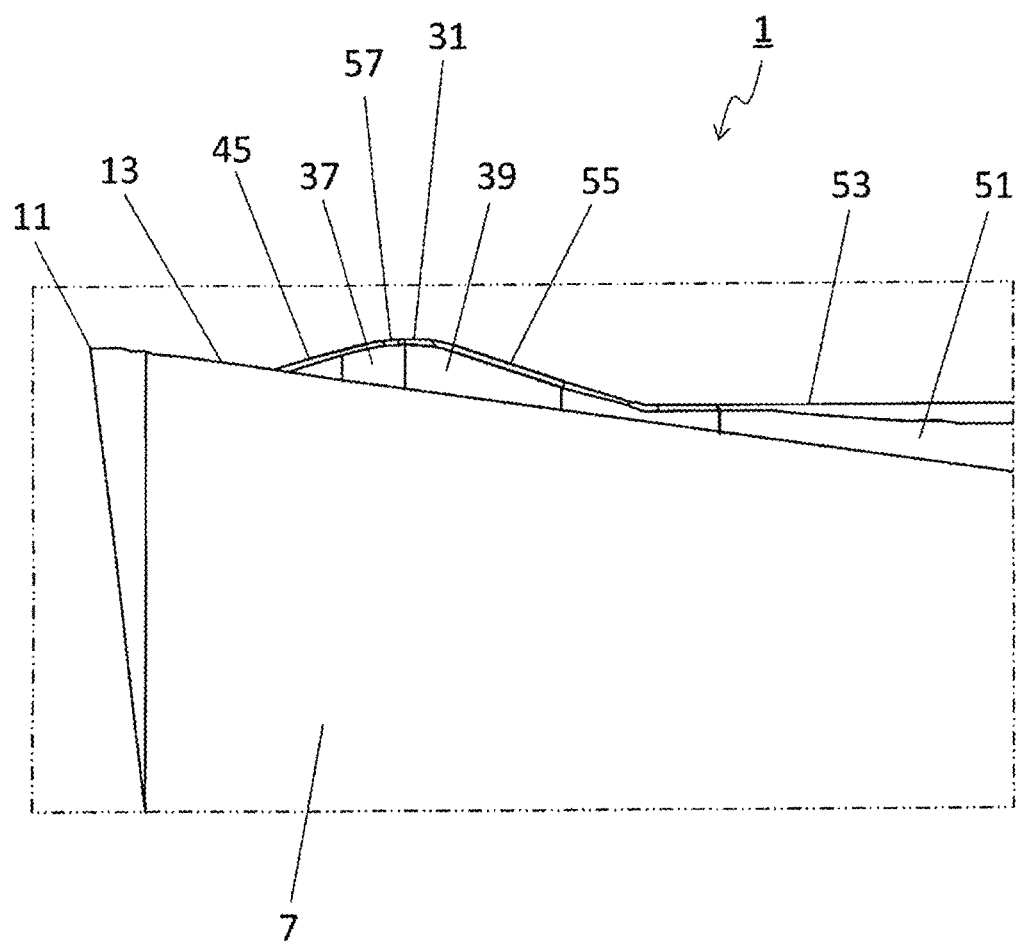
FIG. 7 is an enlarged view of a region A3 illustrated in FIG. 3.

A part of the first protrusion 31 may be located above the first side 13 as in the non-limiting embodiment illustrated in FIG. 7. This may make it easier for chips generated by the first cutting edge 25 to stably come into contact with the first protrusion 31 under machining conditions including a large depth of cut. It may therefore be easy to control the chip flow at the first protrusion 31. The second protrusion 33 may be located below the first side 13. This may facilitate to ensure large space between the first corner 11 and the first protrusion 31. Therefore, the chips may tend to be curled between the first corner 11 and the first protrusion 31.

In cases where the first protrusion 31 includes the boundary 45, the boundary 45 may be located above the first side 13.

The first protrusion 31 and the second protrusion 33 may be located on the bisector L1. The first protrusion 31 and the second protrusion 33 may be in line symmetry with respect to the bisector L1. An area of the first protrusion 31 may be larger than an area of the second protrusion 33. The first protrusion 31 may be in contact with or located away from the second protrusion 33.

The upper surface 3 may further include a rake surface 47 and a bottom surface 49 that is flat and located between the rake surface 47 and the inclined surface 35. The rake surface 47 may be a surface located along an outer peripheral edge of the upper surface 3, namely, at least a part of the first corner 11, the first side 13 and the second side 15, or may be a downward slope that becomes closer to the lower surface 5 as going away from the outer peripheral edge of the upper surface 3. The bottom surface 49 may be flat, or may have a smaller inclination angle than the rake surface 47 and the inclined surface 35. The inclination angle of the bottom surface 49 may be zero. That is, the bottom surface 49 may be parallel to the lower surface 5.

If the upper surface 3 includes the bottom surface 49, chips generated by the first cutting edge 25 may tend to come into contact with three locations of the rake surface 47, the inclined surface 35 and the bottom surface 49. The shapes of chips may tend to become stable because the chips are supported at these three locations. The rake surface 47 may be located along the first corner 11 and the first side 13. The second protrusion 33 may connect to the rake surface 47.

The bottom surface 49 may be located along the first side 13. In other words, the bottom surface 49 may not be located along the first corner 11. It may be easy to control chips at a small depth of cut, for example, in cases where only the first corner cutting edge 23 is used as the cutting edge 9.

The bottom surface 49 may be inclined downward as going away from the first corner 11. This may make it easier to ensure a height of the rake surface 47 even if the cutting edge 9 is inclined downward.

The inclined surface 35 may further include a fourth surface 51 located further away from the first corner 11 than the second surface 39. The fourth surface 51 may have a planar shape. The fourth surface 51 may be inclined upward as going away from the first side 13. The fourth surface 51 may be located on the same surface with the second surface 39. The fourth surface 51 may connect to the second surface 39. The fourth surface 51 may have a maximum area on the inclined surface 35.

In cases where a part of the first side 13 which is located along the fourth surface 51 is used as the cutting edge, the chip discharge performance may be improved if the upper end 39a of the second surface 39 is inclined downward as going away from the first corner 11. If the part of the first side 13 which is located along the fourth surface 51 is used as the cutting edge 9, the chips may tend to have a larger width. If the chips having the large width come into contact with the inclined surface 35 and are then curled so as to come closer to the first side 13, sufficient space for chip flow may not be ensured, thus causing chip clogging.

However, if the upper end 39a is inclined downward as going away from the first corner 11, it may become easier for chips to climb over the inclined surface 35, thus leading to improved chip discharge performance.

The fourth surface 51 may have a larger width in height direction as going away from the first corner 11. If the upper end 39a of the second surface 39 is inclined downward as going away from the first corner 11, the width in the height direction on the fourth surface 51 may tend to become smaller. Therefore, during the time that the part of the first side 13 which is located along the fourth surface 51 is used as the cutting edge 9, chips may not sufficiently come into contact with the fourth surface 51, and a proper brake may not be applied to the chips.

However, if the width in the height direction in the fourth surface 51 increases as going away from the first corner 11 as described above, chips may tend to stably come into contact with the fourth surface 51. Consequently, the proper brake may tend to be applied to the chips on the fourth surface 51. Specifically, at approximately the same timing that, on the first surface 37 and the second surface 39, the proper brake is applied to chips generated by parts of the first side 13 which are located along the first surface 37 and the second surface 39, the proper brake may tend to be applied, on the fourth surface 51, to the part of the first side 13 which is located along the fourth surface 51. This may contribute to stabilizing a flow of chips generated at the parts of the first side 13 which are located along the first surface 37, the second surface 39 and the fourth surface 51.

The first protrusion 31 may further include a fifth surface 53 extended along the fourth surface 51. The fifth surface 53 may have a planar shape. The fifth surface 53 may connect to the fourth surface 51. A height of the fifth surface 53 may be constant or changed. A width of the fifth surface 53 in a direction orthogonal to the bisector L1 may be a third width W3 as in the non-limiting embodiment illustrated in FIG. 2. The third width W3 may increase as going away from the first corner 11.

The first protrusion 31 may further include a sixth surface 55 opposed to the third surface 43 with the top part 31a interposed therebetween. In other words, the first protrusion 31 may further include the sixth surface 55 located between the third surface 43 and the fifth surface 53. The sixth surface 55 may have a planar shape. The sixth surface 55 may be inclined downward as going away from the first corner 11. The sixth surface 55 may connect to the fifth surface 53. The sixth surface 55 may be located along the second surface 39. The sixth surface 55 may connect to the second surface 39. An area of the sixth surface 55 may be larger than an area of the third surface 43.

The chip discharge performance may be improved if the sixth surface 55 is inclined downward as going away from the first corner 11. The chip discharge performance may be improved particularly in cases where the part of the first side 13 which is located along the fourth surface 51 is used as the cutting edge. In cases where the part of the first side 13 which is located along the fourth surface 51 is used as the cutting edge 9 as described above, chips may tend to have a larger width. However, if the sixth surface 55 is inclined downward as going away from the first corner 11, it may be easy to ensure space for chip flow on the third surface 43. That is, the chips may tend to climb over the inclined surface 35, thus leading to the improved chip discharge performance.

The sixth surface 55 may have a triangular shape. A width of the sixth surface 55 in a direction orthogonal to the bisector L1 may be a fourth width W4 as in the non-limiting embodiment illustrated in FIG. 6. The fourth width W4 may increase as going away from the first corner 11. A maximum value of the fourth width W4 may be larger than the maximum value of the first width W1. The maximum value of the fourth width W4 may be smaller than a maximum value of the third width W3.

The first protrusion 31 may include a convex part 57 including the top part 31a. The convex part 57 may be located closest to the first corner 11 at the first protrusion 31. The convex part 57 may include the first surface 37, the second surface 39, the third surface 43 and the sixth surface 55.

For example, inorganic materials, such as cemented carbide, cermet and ceramics, may be usable as a material of the insert 1. Examples of composition of the cemented carbide may include WC(tungsten carbide)-Co, WC—TiC(titanium carbide)-Co and WC—TiC—TaC(tantalum carbide)-Co, in which WC, TiC and TaC may be hard particles and Co may be a binding phase.

The cermet may be a sintered composite material obtainable by compositing metal into a ceramic component. Examples of the cermet may include compounds composed mainly of TiC or TiN(titanium nitride). Of course, it should be clear that the material of the insert 1 is not limited to these materials.

Alternatively, though not particularly illustrated, the insert 1 may be configured to include a base (substrate) including the above material, and a coating layer to cover the base. Examples of material of the coating layer may include carbides, nitrides, oxides, oxocarbons, nitrogen oxides, carbonitrides and carboxynitrides of titanium.

The coating layer may include one or a plurality of the above materials. The coating layer may be formed by one layer or a plurality of layers laminated one upon another. The material of the coating layer is not limited to the above materials.

The coating layer may be located on the base by using chemical vapor deposition (CVD) method or physical vapor deposition (PVD) method.

<Cutting Tools>

Cutting tools 101 in non-limiting embodiments of the present disclosure may be described below with reference to the drawings.

Figure 10:
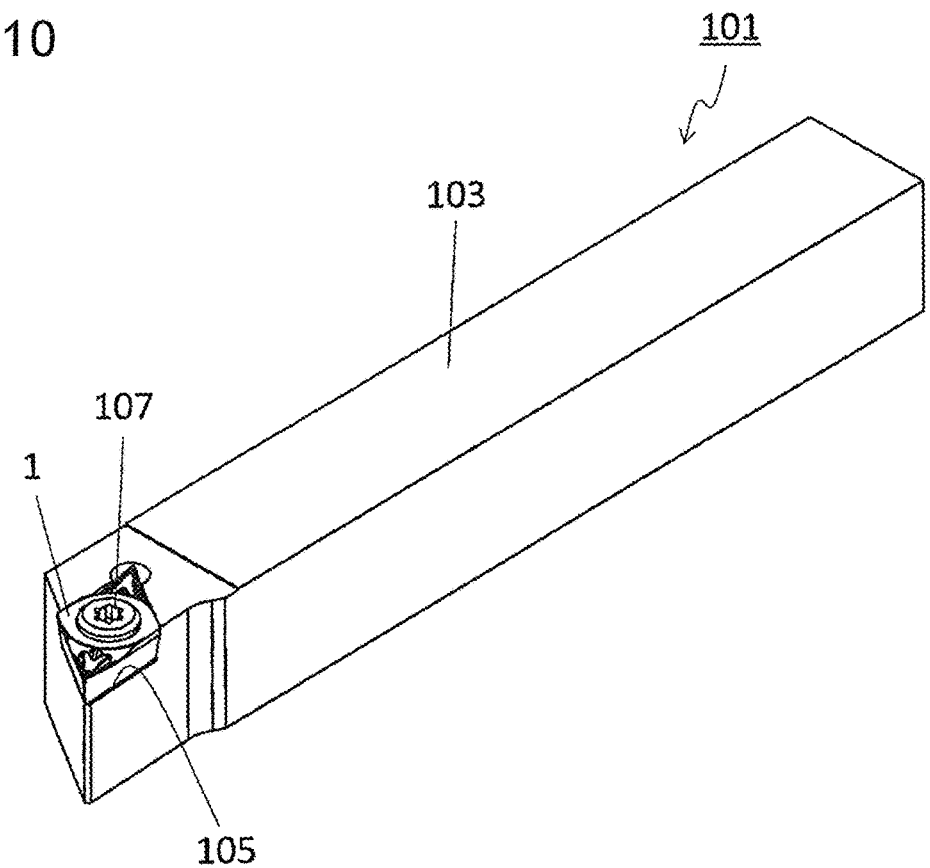
FIG. 10 is a perspective view illustrating a cutting tool in a non-limiting embodiment of the present disclosure.

The cutting tool 101 may include a holder 103 and an insert 1 as in a non-limiting embodiment illustrated in FIG. 10. If the cutting tool 101 includes the insert 1, excellent cutting performance may be attainable because of high chip discharge performance of the insert 1.

The holder 103 may have a bar shape. The holder 103 may include a pocket 105 located on a side of a front end. The pocket 105 may be a part that permits attachment of the insert 1. The pocket 105 may open into a front end surface and a lateral surface of the holder 103. The pocket 105 may include a seating surface parallel to a lower surface of the holder 103, and a constraining lateral surface inclined relative to the seating surface. These cases may facilitate the attachment of the insert 1.

The insert 1 may be located in the pocket 105. The lower surface 5 of the insert 1 may be in direct contact with the pocket 105. Alternatively, a sheet may be disposed between the insert 1 and the pocket 105.

The insert 1 may be attached to the holder 103 so that the cutting edge 9 may be protruded from the front end of the holder 103. Alternatively, the insert 1 may be attached to the holder 103 with a screw 107 as in a non-limiting embodiment illustrated in FIG. 10. Specifically, the insert 1 may be attached to the holder 103 by inserting the screw 107 into the through hole 29 of the insert 1, and by inserting a front end of the screw 107 into a screw hole formed in the pocket 105 so as to establish thread engagement between screw parts.

For example, steel and cast iron may be usable as a material of the holder 103. If the material of the holder 103 is steel, the holder 103 may have high toughness.

The non-limiting embodiment illustrated in FIG. 10 may illustrate the cutting tool 101 used for a so-called turning process. Examples of the turning process may include inner diameter processing, outer diameter processing and grooving process. The cutting tool 101 (insert 1) is not limited to ones which are used for the turning process. For example, the insert 1 may be used for the cutting tool 101 for a milling process.

<Methods for Manufacturing Machined Product>

Methods for manufacturing a machined product 201 in non-limiting embodiments of the present disclosure may be described below with reference to the drawings.

The machined product 201 may be manufacturable by carrying out a cutting process of a workpiece 203. The methods for manufacturing the machined product 201 in the non-limiting embodiments may include the following steps:
(1) rotating the workpiece 203;
(2) bringing the cutting tool 101 represented by the above non-limiting embodiments into contact with the workpiece 203 being rotated; and
(3) moving the cutting tool 101 away from the workpiece 203.

Figure 11:
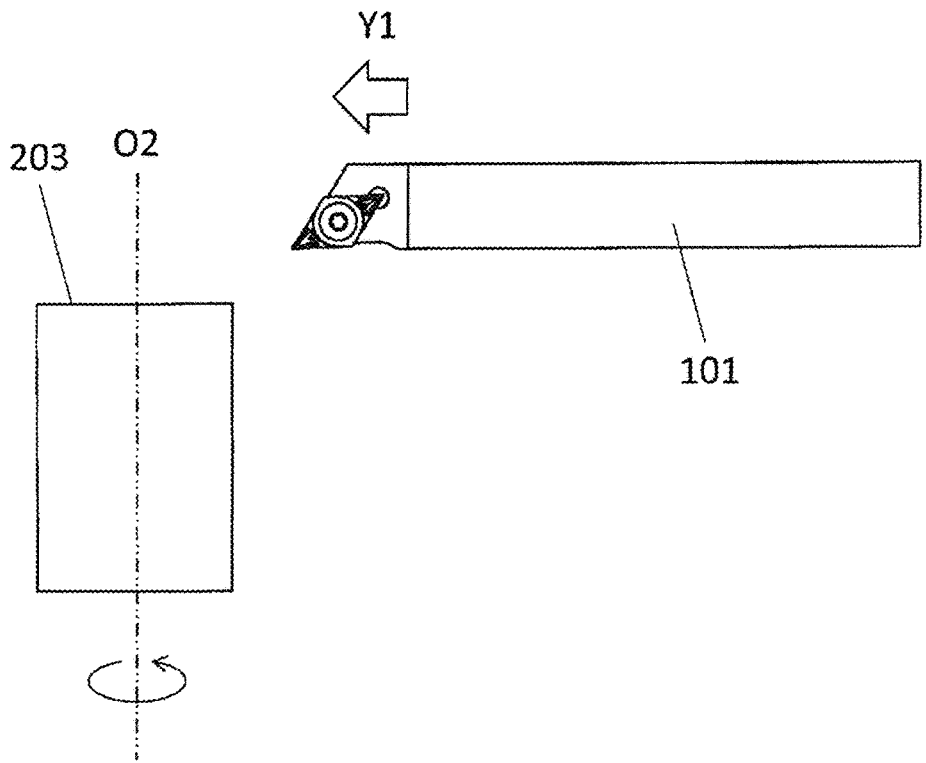
FIG. 11 is a schematic diagram illustrating one of steps in a method for manufacturing a machined product in a non-limiting embodiment of the present disclosure.
Figure 12:
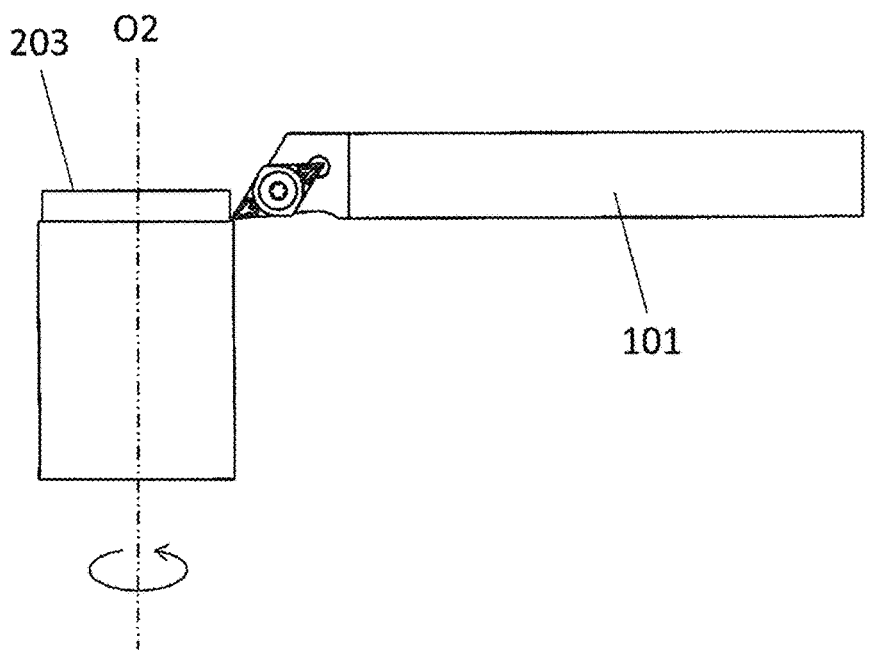
FIG. 12 is a schematic diagram illustrating one of the steps in the method for manufacturing a machined product in the non-limiting embodiment of the present disclosure.
Figure 13:
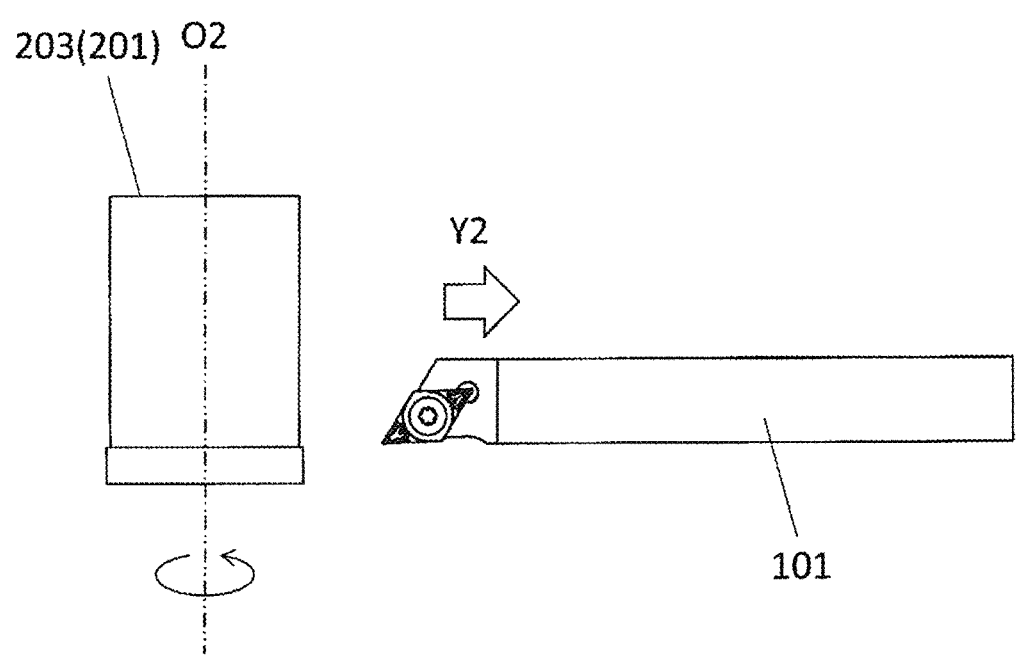
FIG. 13 is a schematic diagram illustrating one of the steps in the method for manufacturing a machined product in the non-limiting embodiment of the present disclosure.

More specifically, firstly, the workpiece 203 may be rotated around an axis O2 as in a non-limiting embodiment illustrated in FIG. 11, and the cutting tool 101 may be relatively brought near the workpiece 203. Subsequently, the workpiece 203 may be cut out by bringing the cutting edge 9 of the insert 1 in the cutting tool 101 into contact with the workpiece 203 as in a non-limiting embodiment illustrated in FIG. 12. Thereafter, the cutting tool 101 may be relatively moved away from the workpiece 203 as in a non-limiting embodiment illustrated in FIG. 13.

As in the non-limiting embodiment illustrated in FIG. 11, the cutting tool 101 may be brought near the workpiece 203 by moving the cutting tool 101 in a Y1 direction in a state where the axis O2 is fixed and the workpiece 203 is rotated around the axis O2. As in the non-limiting embodiment illustrated in FIG. 12, the workpiece 203 may be cut out by bringing the cutting edge 9 of the insert 1 into contact with the workpiece 203 being rotated. As in the non-limiting embodiment illustrated in FIG. 13, the cutting tool 101 may be moved away by moving the cutting tool 101 in a Y2 direction in a state where the workpiece 203 is rotated.

In the method for manufacturing the machined product 201 in the non-limiting embodiment of the present disclosure, the use of the cutting tool 101 including the insert 1 may offer the high chip discharge performance of the insert 1. It may therefore be possible to obtain the machined product 201 whose finished surface has high accuracy.

In the cutting process with the manufacturing method in the non-limiting embodiments, the cutting tool 101 may be brought into contact with the workpiece 203, or the cutting tool 101 may be moved away from the workpiece 203 by moving the cutting tool 101 in the individual steps. However, it is not intended to limit to this embodiment.

For example, the workpiece 203 may be brought near the cutting tool 101 in the step (1). Similarly, the workpiece 203 may be moved away from the cutting tool 101 in the step (3). If it is desired to continue the cutting process, the step of bringing the cutting edge 9 of the insert 1 into contact with different portions of the workpiece 203 may be repeated while keeping the workpiece 203 rotated.

Representative examples of material of the workpiece 203 may include carbon steel, alloy steel, stainless steel, cast iron and nonferrous metals.

The invention claimed is:

1. A cutting insert, comprising:
   an upper surface comprising a first corner and a first side extended from the first corner;
   a lower surface opposite to the upper surface;
   a lateral surface located between the upper surface and the lower surface; and
   a cutting edge located on an intersection of the upper surface and the lateral surface,
   the upper surface further comprising
      a first protrusion being away from the first corner and having a peak in a side view, and
      a second protrusion located between the first corner and the first protrusion, the first protrusion comprising an inclined surface located along the first side, the inclined surface comprising
      a first surface, and
      a second surface located further away from the first corner than the first surface,
   the first surface and the second surface being individually inclined upward as going away from the first side, and having a concave shape as a whole.

2. The cutting insert according to claim 1, wherein an upper end of the first surface is located further away from the first side as going away from the first corner in a top view.

3. The cutting insert according to claim 1, wherein an upper end of the second surface is approximately parallel to the first side in a top view.

4. The cutting insert according to claim 1, wherein the peak of the first protrusion is located on an extension line of a boundary between the first surface and the second surface.

5. The cutting insert according to claim 1, wherein the second protrusion is inclined closer to the lower surface as the second protrusion extends away from the first corner, in a cross section along a bisector of the first corner.

6. The cutting insert according to claim 1, wherein the first protrusion further comprises a third surface faced to the first corner.

7. The cutting insert according to claim 6, wherein the third surface has a triangular shape.

8. The cutting insert according to claim 6, wherein a width of the third surface is a first width and a width of the second protrusion is a second width in a direction orthogonal to a bisector of the first corner, and a maximum value of the first width is smaller than a maximum value of the second width.

9. The cutting insert according to claim 1, wherein the first protrusion is a two-step inclination in a cross section along a bisector of the first corner.

10. The cutting insert according to claim 9, wherein a boundary of the two-step inclination is higher than the second protrusion.

11. The cutting insert according to claim 1, wherein the second protrusion has a curved surface shape.

12. The cutting insert according to claim 1, wherein a part of the first protrusion is located above the first side, and the second protrusion is located below the first side.

13. The cutting insert according to claim 12, wherein
the first protrusion is a two-step inclination in a cross section along a bisector of the first corner, and
a boundary of the two-step inclination is located above the first side.

14. The cutting insert according to claim 1, wherein the upper surface further comprises a rake surface and a bottom surface that is flat and located between the rake surface and the inclined surface.

15. The cutting insert according to claim 14, wherein the bottom surface is located along the first side.

16. The cutting insert according to claim 14, wherein the bottom surface is inclined downward as going away from the first corner.

17. The cutting insert according to claim 1, wherein the second surface is inclined downward as going away from the first corner.

18. A cutting tool, comprising:
a holder having a bar shape and comprising a pocket located on a side of a front end; and
a cutting insert, the cutting insert being located in the pocket, wherein the cutting insert includes:
an upper surface comprising a first corner and a first side extended from the first corner;
a lower surface opposite to the upper surface;
a lateral surface located between the upper surface and the lower surface; and
a cutting edge located on an intersection of the upper surface and the lateral surface,
the upper surface further comprising
a first protrusion being away from the first corner and having a peak in a side view, and
a second protrusion located between the first corner and the first protrusion, the first protrusion comprising an inclined surface located along the first side,
the inclined surface comprising
a first surface, and
a second surface located further away from the first corner than the first surface,
the first surface and the second surface being individually inclined upward as going away from the first side, and having a concave shape as a whole.

19. A method for manufacturing a machined product, the method comprising:
rotating a workpiece;
bringing a cutting tool into contact with the workpiece being rotated; and
moving the cutting tool away from the workpiece,
wherein the cutting insert includes:
an upper surface comprising a first corner and a first side extended from the first corner;
a lower surface opposite to the upper surface;
a lateral surface located between the upper surface and the lower surface; and
a cutting edge located on an intersection of the upper surface and the lateral surface,
the upper surface further comprising
a first protrusion being away from the first corner and having a peak in a side view, and
a second protrusion located between the first corner and the first protrusion, the first protrusion comprising an inclined surface located along the first side,
the inclined surface comprising
a first surface, and
a second surface located further away from the first corner than the first surface,
the first surface and the second surface being individually inclined upward as going away from the first side, and having a concave shape as a whole.

* * * * *